United States Patent
Vasseur

(10) Patent No.: US 7,522,603 B2
(45) Date of Patent: Apr. 21, 2009

(54) TECHNIQUE FOR EFFICIENTLY ROUTING IP TRAFFIC ON CE-CE PATHS ACROSS A PROVIDER NETWORK

(75) Inventor: Jean-Philippe Vasseur, Dunstable, MA (US)

(73) Assignee: Cisco Technology, Inc., San Jose, CA (US)

( * ) Notice: Subject to any disclaimer, the term of this patent is extended or adjusted under 35 U.S.C. 154(b) by 359 days.

(21) Appl. No.: 11/375,216

(22) Filed: Mar. 14, 2006

(65) Prior Publication Data

US 2007/0217419 A1    Sep. 20, 2007

(51) Int. Cl.
H04L 12/28 (2006.01)
H04L 12/56 (2006.01)
H04L 1/00 (2006.01)
H04L 12/26 (2006.01)

(52) U.S. Cl. .............. 370/392; 370/238.1; 370/252
(58) Field of Classification Search ........... 370/238, 370/238.1, 252

See application file for complete search history.

(56) References Cited

U.S. PATENT DOCUMENTS

| | | |
|---|---|---|
| 6,339,595 B1 | 1/2002 | Rekhter et al. |
| 6,463,061 B1 | 10/2002 | Rekhter et al. |
| 6,526,056 B1 | 2/2003 | Rekhter et al. |
| 6,553,423 B1 | 4/2003 | Chen |
| 6,693,878 B1 | 2/2004 | Daruwalla et al. |
| 6,856,991 B1 | 2/2005 | Srivastava |
| 6,970,464 B2 | 11/2005 | Xu et al. |
| 7,180,866 B1 * | 2/2007 | Chartre et al. .............. 370/242 |
| 2005/0044262 A1 | 2/2005 | Luo |
| 2005/0111375 A1 * | 5/2005 | Ravindran et al. .......... 370/252 |
| 2005/0190757 A1 | 9/2005 | Sajassi |

(Continued)

FOREIGN PATENT DOCUMENTS

DE    WO 2004/051939 A1 *    6/2004

OTHER PUBLICATIONS

U.S. Appl. No. 11/302,595, entitled Technique for Enabling Traffic Engineering on CE-CE Paths Across a Provider Network, by Jean-Philippe Vasseur on Dec. 14, 2005.

(Continued)

*Primary Examiner*—Ronald Abelson
(74) *Attorney, Agent, or Firm*—Cesari and McKenna LLP

(57) ABSTRACT

A technique efficiently routes Internet Protocol (IP) traffic on paths between customer edge devices (CEs) across a provider network ("CE-CE paths") in a computer network. According to the novel technique, a path computation element (PCE), e.g., a provider edge device (PE), may learn dynamic link attribute information of remote links from the provider network to one or more remote CEs (e.g., "PE-CE links" or "CE-PE links"). A multi-homed requesting CE requests from the PCE a set of CE-CE path metrics (e.g., costs) to one or more remote destination address prefixes, e.g., via each multi-homed CE-PE link from the requesting CE. In response to the request, the PCE computes the set of available CE-CE paths and current metrics to the remote destination address prefixes and returns the corresponding CE-CE path metrics to the requesting CE. The requesting CE modifies its IP forwarding entries accordingly in order to perform IP traffic routing corresponding to the CE-CE path metrics (e.g., asymmetrical load balancing) across its multi-homed CE-PE links.

29 Claims, 7 Drawing Sheets

U.S. PATENT DOCUMENTS

2005/0226245 A1 10/2005 Meda
2006/0013232 A1 1/2006 Xu et al.
2006/0039391 A1 2/2006 Vasseur
2006/0155875 A1* 7/2006 Cheriton ..................... 709/245

OTHER PUBLICATIONS

Tanenbaum, Andrew S., Section 1.4.2 The TCP/IP Reference Model, Computer Networks: Fourth Edition, pp. 41-44, Pearson Education, Inc., 2003.

Perlman, Radia, Interconnections Second Edition: Bridges, Routers, Switches, and Internetworking Protocols, Sections 12.1-12.3 pp. 299-324, Addison Wesley Longman, Inc. 2000.

Y. Rekhter and T. Li, RFC 1771, entitled A Border Gateway Protocol 4 (BGP-4), pp. 1-54, Mar. 1995.

LeRourx, et al., Internet Draft, entitled IGP Protocol Extensions for Path Computation Element (PCE) Discovery (draft-ietf-pce-disco-proto-igp-01.txt), pp. 1-31, Mar. 2006.

Pepelnjak, I. et al., MPLS and VPN Architectures, Chapter 8, pp. 145-205, Cisco Press, 2001.

Rosen, et al., RFC 4364, entitled BGP/MPLS IP Virtual Private Networks (VPNs), pp. 1-44, Feb. 2006.

BGP Link Bandwidth, Cisco Systems, Inc., pp. 1-16, Mar. 2005.

Andersson, et al., RFC 3036, entitled LDP Specification, pp. 1-99, Jan. 2001.

Mannie, E., RFC 3945, entitled Generalized Multi-Protocol Label Switching (GMPLS) Architecture, pp. 1-54, Oct. 2004.

Mannie, E., RFC 3946, entitled Generalized Multi-Protocol Label Switching (GMPLS) Extensions for Synchronous Optical Network (SONET) and Synchronous Digital Hierarchy (SDH) Control, pp. 1-25, Oct. 2004.

Vasseur, et al., Internet Draft, entitled Path Computation Element (PCE) Communication Protocol (PCEP)—Version 1 (draft-ietf-pce-pcep-01.txt), pp. 1-54, Feb. 24, 2006.

* cited by examiner

| REQUESTING NODE 505 | REQUEST ID 510 | PATH(S) 515 | METRIC(S) 420 |
|---|---|---|---|
| CE 1 | 1 | PATH 1/PATH 2 | X/Y |
| CE 1 | 2 | PATH 3 | Z |
| ... | ... | ... | ... |

STORED REQUESTS TABLE 500

ENTRIES 530

FIG. 5

TECHNIQUE FOR EFFICIENTLY ROUTING IP TRAFFIC ON CE-CE PATHS ACROSS A PROVIDER NETWORK

RELATED APPLICATION

This application is related to U.S. application Ser. No. 11/302,595, entitled TECHNIQUE FOR ENABLING TRAFFIC ENGINEERING ON CE-CE PATHS ACROSS A PROVIDER NETWORK, filed by Vasseur on Dec. 14, 2005, the contents of which are hereby incorporated in its entirety.

BACKGROUND OF THE INVENTION

1. Field of the Invention

The present invention relates to computer networks and more particularly to Internet Protocol (IP) traffic routing between customer edge devices (CEs) across a provider network in a computer network.

2. Background Information

A computer network is a geographically distributed collection of interconnected subnetworks, such as local area networks (LAN) that transport data between network nodes. As used herein, a network node is any device adapted to send and/or receive data in the computer network. Thus, in this context, "node" and "device" may be used interchangeably. The network topology is defined by an arrangement of network nodes that communicate with one another, typically through one or more intermediate nodes, such as routers and switches. In addition to intra-network communications, data also may be exchanged between neighboring (i.e., adjacent) networks. To that end, "edge devices" located at the logical outer-bound of the computer network may be adapted to send and receive inter-network communications. Both inter-network and intra-network communications are typically effected by exchanging discrete packets of data according to predefined protocols. In this context, a protocol consists of a set of rules defining how network nodes interact with each other.

Each data packet typically comprises "payload" data prepended ("encapsulated") by at least one network header formatted in accordance with a network communication protocol. The network headers include information that enables network nodes to efficiently route the packet through the computer network. Often, a packet's network headers include a data-link (layer 2) header, an internetwork (layer 3) header and a transport (layer 4) header as defined by the Transmission Control Protocol/Internet Protocol (TCP/IP) Reference Model. The TCP/IP Reference Model is generally described in more detail in Section 1.4.2 of the reference book entitled *Computer Networks, Fourth Edition*, by Andrew Tanenbaum, published 2003, which is hereby incorporated by reference as though fully set forth herein. A data packet may originate at a source node and subsequently "hop" from node to node along a logical data path until it reaches its addressed destination node. The network addresses defining the logical data path of a data flow are most often stored as Internet Protocol (IP) addresses in the packet's internetwork header.

A computer network may contain smaller groups of one or more subnetworks which may be managed as separate routing domains. As used herein, a routing domain is broadly construed as a collection of interconnected network nodes under a common administration. Often, a routing domain is managed by a single administrative entity, such as a company, an academic institution or a branch of government. Such a centrally-managed routing domain is sometimes referred to as an "autonomous system" or AS. In general, a routing domain may operate as an enterprise network, a service provider or any other type of network or subnetwork. Further, the routing domain may contain one or more edge devices having "peer" connections to edge devices in adjacent routing domains.

Network nodes within a routing domain are typically configured to forward data using predetermined paths from "interior gateway" routing protocols, such as conventional link-state protocols and distance-vector protocols. These interior gateway protocols (IGPs) define the manner with which routing information and network-topology information are exchanged and processed in the routing domain. The routing information exchanged (e.g., by IGP messages) typically includes destination address prefixes, i.e., the portions of destination addresses used by the routing protocol to render routing ("next hop") decisions. Examples of such destination addresses include IP version 4 (IPv4) and version 6 (IPv6) addresses. As such, each intermediate node receives a consistent "view" of the domain's topology. Examples of link-state and distance-vectors protocols known in the art, such as the Open Shortest Path First (OSPF) protocol and Routing Information Protocol (RIP), are described in Sections 12.1-12.3 of the reference book entitled *Interconnections, Second Edition*, by Radia Perlman, published January 2000, which is hereby incorporated by reference as though fully set forth herein.

In practice, each IGP node typically generates and disseminates an IGP message ("advertisement") whose routing information includes a list of the intermediate node's neighboring network nodes and one or more "cost" values associated with each neighbor. As used herein, a cost value associated with a neighboring node is an arbitrary metric used to determine the relative ease/burden of communicating with that node. For instance, the cost value may be measured in terms of the number of hops required to reach the neighboring node, the average time for a packet to reach the neighboring node, the amount of network traffic or available bandwidth over a communication link coupled to the neighboring node, etc.

IGP messages are usually flooded until each intermediate network IGP node has received an IGP message from each of the other interconnected intermediate nodes. Then, each of the IGP nodes (e.g., in a link-state protocol) can construct the same "view" of the network topology by aggregating the received lists of neighboring nodes and cost values. To that end, each IGP node may input this received routing information to a "shortest path first" (SPF) calculation that determines the lowest-cost network paths that couple the intermediate node with each of the other network nodes. For example, the Dijkstra algorithm is a conventional technique for performing such a SPF calculation, as described in more detail in Section 12.2.4 of the above-referenced book entitled *Interconnections Second Edition*, by Radia Perlman. Each IGP node updates the routing information stored in its local routing table based on the results of its SPF calculation. More specifically, a routing information base (RIB) updates the routing table to correlate destination nodes with next-hop interfaces associated with the lowest-cost paths to reach those nodes, as determined by the SPF calculation.

The Border Gateway Protocol (BGP) is usually employed as an "external gateway" routing protocol for routing data between autonomous systems. BGP is well known and generally described in Request for Comments (RFC) 1771, entitled *A Border Gateway Protocol 4 (BGP-4)*, by Y. Rekhter et al., published March 1995, which is publicly available through the Internet Engineering Task Force (IETF) and is hereby incorporated by reference in its entirety. External (or exterior) BGP (eBGP) is often used to exchange routing information across routing domain boundaries. Internal BGP (iBGP) is a variation of the eBGP protocol and is often used to distribute inter-network reachability information (address prefixes) among BGP-enabled edge devices situated within the same routing domain. BGP generally operates over a reliable transport protocol, such as TCP, to establish a TCP connection/BGP session. BGP also may be extended for compatibility with services other than standard Internet connectivity. For instance, Multi-Protocol BGP (MP-BGP) supports various address family identifier (AFI) fields that permit BGP messages to transport multi-protocol information, such as is the case with RFC 2547 services, discussed below.

A network node within a routing domain may detect a change in the domain's topology. For example, the node may become unable to communicate with one of its neighboring nodes, e.g., due to a link failure between the nodes or the neighboring node failing, such as going "off line," etc. If the detected node or link failure occurred within the routing domain, the detecting node may advertise the intra-domain topology change to other nodes in the domain using IGP messages. Similarly, if an edge device detects a node or link failure that prevents communications with a neighboring routing domain, the edge device may disseminate the inter-domain topology change to other edge devices within its routing domain (e.g., using the iBGP protocol). In either case, propagation of the network-topology change occurs within the routing domain and nodes in the domain thus converge on a consistent view of the new network topology, i.e., without the failed node or link.

A virtual private network (VPN) is a collection of network nodes that establish private communications over a shared backbone network. Previously, VPNs were implemented by embedding private leased lines in the shared network. The leased lines (i.e., communication links) were reserved only for network traffic among those network nodes participating in the VPN. Today, the above-described VPN implementation has been mostly replaced by private "virtual circuits" deployed in public networks. Specifically, each virtual circuit defines a logical end-to-end data path between a pair of network nodes participating in the VPN. When the pair of nodes is located in different routing domains, edge devices in a plurality of interconnected routing domains may have to cooperate to establish the nodes' virtual circuit.

A virtual circuit may be established using, for example, conventional layer-2 Frame Relay (FR) or Asynchronous Transfer Mode (ATM) networks. Alternatively, the virtual circuit may "tunnel" data between its logical end points using known layer-2 and/or layer-3 tunneling protocols, such as the Layer-2 Tunneling Protocol (L2TP) and the Generic Routing Encapsulation (GRE) protocol. In this case, one or more tunnel headers are prepended to a data packet to appropriately route the packet along the virtual circuit. The Multi-Protocol Label Switching (MPLS) protocol may be used as a tunneling mechanism for establishing layer-2 virtual circuits or layer-3 network-based VPNs through an IP network.

Generally, label switching techniques may be used to build end-to-end tunnels through an IP/MPLS network of label switched routers (LSRs). These tunnels are a type of label switched path (LSP) and thus are generally referred to as MPLS LSPs. Establishment of an LSP from a head-end LSR to a tail-end LSR involves computation of a path through a network of LSRs. Optimally, the computed path is the "shortest" path, as measured in some metric (e.g., cost). Notably, MPLS Traffic Engineering (TE) techniques may be used to ensure that the LSP (a "TE-LSP") satisfies all relevant LSP Traffic Engineering constraints such as e.g., required bandwidth, "affinities" (administrative constraints to avoid or include certain links), etc. Moreover, a Label Distribution Protocol (LDP) may be used to share the particular labels used among network nodes, as will be understood by those skilled in the art.

Path computation can either be performed by the head-end LSR or by some other entity operating as a path computation element (PCE) not co-located on the head-end LSR. The head-end LSR (or a PCE) exploits its knowledge of network topology and resources available on each link to perform the path computation (e.g., according to the LSP Traffic Engineering constraints). Various path computation methodologies are available including SPF, or CSPF (constrained shortest path first) for TE-LSPs. MPLS LSPs can be configured within a single domain, e.g., area, level, or AS, or may also span multiple domains, e.g., areas, levels, or ASes.

The PCE is an entity having the capability to compute paths between any nodes of which the PCE is aware in an AS or area. PCEs are especially useful in that they are more cognizant of network traffic and path selection within their AS or area, and thus is may be used for more optimal path computation. A head-end LSR may further operate as a path computation client (PCC) configured to send a path computation request to the PCE, and receive a response with the computed path, which potentially takes into consideration other path computation requests from other PCCs. It is important to note that when one PCE sends a request to another PCE, it acts as a PCC. PCEs conventionally have limited or no visibility outside of their surrounding area(s), level(s), or AS. A PCC can be informed of a PCE either by pre-configuration by an administrator, or by a PCE Discovery (PCED) message ("advertisement"), which is sent from the PCE within its area or level or across the entire AS to advertise its services. An example IGP-based PCED is described in LeRoux, et al., *IGP Protocol Extensions for Path Computation Element (PCE) Discovery)* <draft-ietf-pce-disco-proto-igp-01.*txt*>, Internet Draft, March 2006, the contents of which are hereby incorporated by reference in its entirety.

Layer-3 network-based VPN services that utilize MPLS technology are often deployed by network service providers for one or more customer sites. These networks are typically said to provide "MPLS/VPN" services. As used herein, a customer site is broadly defined as a routing domain containing at least one customer edge device (CE) coupled to a provider edge device (PE) in the service provider's network ("provider network"). The customer site may be multi-homed to the provider network, i.e., wherein one or more of the customer's CEs is coupled to a plurality of PEs, thus providing a redundant connection. The PEs and CEs are generally intermediate network nodes, such as routers or switches, located at the edges of their respective networks. PE-CE links may be established over various physical media, such as conventional wire links, optical links, wireless links, etc., and may communicate data formatted using various network communication protocols including ATM, Frame Relay, Ethernet, Fibre Distributed Data Interface (FDDI), etc. In addition, the PEs and CEs may be configured to exchange routing information over their respective PE-CE links in accordance with various interior and exterior gateway protocols, such as BGP, OSPF, IS-IS, RIP, etc.

In the traditional MPLS/VPN network architecture, each customer site may participate in one or more different VPNs. Most often, each customer site is associated with a single VPN, and hereinafter the illustrative embodiments will assume a one-to-one correspondence between customer sites and VPNs. For example, customer sites owned or managed by a common administrative entity, such as a corporate enterprise, may be statically assigned to the enterprise's VPN. As such, network nodes situated in the enterprise's various customer sites participate in the same VPN and are therefore permitted to securely communicate with one another via the provider network. In other words, the provider network establishes the necessary LSPs to interconnect the customer sites participating in the enterprise's VPN. Likewise, the provider network also may establish LSPs that interconnect customer sites participating in other VPNs. This widely-deployed MPLS/VPN architecture is generally described in more detail in Chapters 8-9 of the reference book entitled *MPLS and VPN Architecture, Volume* 1, by I. Pepelnjak et al., published 2001 and in the IETF publication RFC 4364, entitled *BGP/MPLS IP Virtual Private Networks (VPNs)*, by E. Rosen et al., published February 2006, each of which is hereby incorporated by reference as though fully set forth herein.

One problem associated with MPLS/VPN networks is their current inability to distribute TE information regarding PE-CE links across the provider network to other PEs. Traffic Engineering (TE), generally, refers to utilizing TE information to engineer (compute, determine, detect, etc.) traffic, such as for computing paths, creating TE-LSPs (e.g., MPLS TE-LSPs), load-balancing IP traffic, etc., as will be understood by those skilled in the art. Examples of TE information comprise, inter alia, the dynamically measured IP bandwidth, reservable MPLS bandwidth, unreserved bandwidth, administrative group (color), TE metric, or other conventional metrics that may be used for TE, e.g., cost. Notably, TE information may not only be used for MPLS, but also for IP, as will be understood by those skilled in the art.

One solution for distributing static link bandwidth of PE-CE links (or, more generally, an AS exit link) has been described in the document entitled *BGP Link Bandwidth*, published by Cisco Systems, Inc., March 2005, which is hereby incorporated by reference as though fully set forth herein. Here, the static link bandwidth of the PE-CE link (i.e., the maximum link capacity) may be advertised to BGP neighbors (e.g., other PEs). However, this solution does not provide TE information of the PE-CE links, such as, e.g., the dynamically measured IP bandwidth, reserved MPLS bandwidth, color, etc. of the PE-CE links.

Another solution to distribute TE information of PE-CE links is to leak the information into the provider network (the "core"), such as through IGP messages. This solution suffers numerous problems, however, such as VPN private addressing constraints, i.e., where CEs of different VPNs may share the same address, which may cause route confusion at receiving devices. Also, a lack of scalability may exist considering the possible number of PE-CE links (e.g., hundreds of thousands), which may surpass the limitations of internal route leaking (e.g., of IGP messages), thus possibly causing fragmented messages, error messages, etc., as will be understood by those skilled in the art. This lack of scalability may also apply to attempts to manually configure TE information, which would be overly cumbersome given the dynamic nature of TE information.

As a result of the inability to efficiently distribute dynamic TE information, various TE techniques may not be applied to the PE-CE links from other PEs not attached to the PE-CE links. In particular, TE techniques may not be applied to paths from one CE to another CE across the provider network ("CE-CE paths"). For example, CEs are sometimes multi-homed to a provider network, such as to provide multiple paths into the provider network for, e.g., redundancy, route flexibility (best path selection options). For IP routing, in particular, the CE may be unaware of the metrics used by the provider network beyond any locally attached PEs. Accordingly, the CE is unable to efficiently route traffic (IP traffic) over its multi-homed links. For instance, selecting a first CE-PE link into the provider network (e.g., at a first PE) based on known metrics of that link may not be an adequate representation of the metrics beyond the first PE. In other words, a CE-PE link that appears to the CE to be the best selection based on CE-PE link metrics, may, in fact, not be the best, such as where the path metrics within the provider network and beyond are greater from the first PE than from a second PE attached to the CE. Also, any attempt to load balance traffic over the multi-homed CE-PE links would be equally as inefficient. Currently, IP traffic load balancing over multi-homed CE-PE links may be symmetric (i.e., half of the traffic over a first link, the other half over a second link, etc.) or asymmetric based on the CE-PE link (e.g., traffic may be distributed proportionally to the link metrics of the CE-PE links). Again, however, neither load balancing solution offers efficient selection based on metrics beyond the CE-PE links. Without path metrics of the provider network, and more particularly, without end-to-end (CE-CE) path metrics, therefore, the CE may be inefficiently routing IP traffic.

There remains a need, therefore, for a technique that expands the TE topology of a provider/customer network (e.g., an MPLS/VPN network) to include the TE information of PE-CE links, such that various TE techniques may be applied to the network. There also remains a need for a technique for efficiently routing IP traffic over multi-homed CE-PE links (e.g., and based on complete CE-CE paths), and for applying PCE techniques to IP traffic, generally.

SUMMARY OF THE INVENTION

The present invention is directed to a technique for efficiently routing Internet Protocol (IP) traffic on paths between customer edge devices (CEs) across a provider network ("CE-CE paths") in a computer network. According to the novel technique, a path computation element (PCE), e.g., a provider edge device (PE), may learn dynamic link attribute information of remote links from the provider network to one or more remote CEs (e.g., "PE-CE links" or "CE-PE links"). A multi-homed requesting CE requests from the PCE a set of CE-CE path metrics (e.g., costs) to one or more remote destination address prefixes, e.g., via each multi-homed CE-PE link from the requesting CE. Notably, the request may indicate one or more requested path attributes (required diversity, maximum cost, etc.). In response to the request, the PCE computes the set of available CE-CE paths and current metrics to the remote destination address prefixes and returns the corresponding CE-CE path metrics to the requesting CE. The requesting CE modifies its IP forwarding entries accordingly in order to perform IP traffic routing corresponding to the CE-CE path metrics (e.g., asymmetrical load balancing) across its multi-homed CE-PE links.

Advantageously, the novel technique efficiently routes IP traffic on CE-CE paths in a computer network. By utilizing PCEs with knowledge of dynamic link attribute information of CE-CE path links, the novel technique allows for a multi-homed CE to efficiently route, e.g., load balance, IP traffic across its multi-homed CE-PE links accordingly. In particular, the novel technique advantageously utilizes PCEs for IP traffic. Further, the dynamic nature of the novel technique alleviates the need for cumbersome manual configuration.

BRIEF DESCRIPTION OF THE DRAWINGS

The above and further advantages of the invention may be better understood by referring to the following description in conjunction with the accompanying drawings in which like reference numerals indicate identically or functionally similar elements, of which:

FIG. 5 is a schematic block diagram of an exemplary stored requests table that may be used in accordance with the present invention;

DETAILED DESCRIPTION OF AN ILLUSTRATIVE EMBODIMENT

Figure 1:
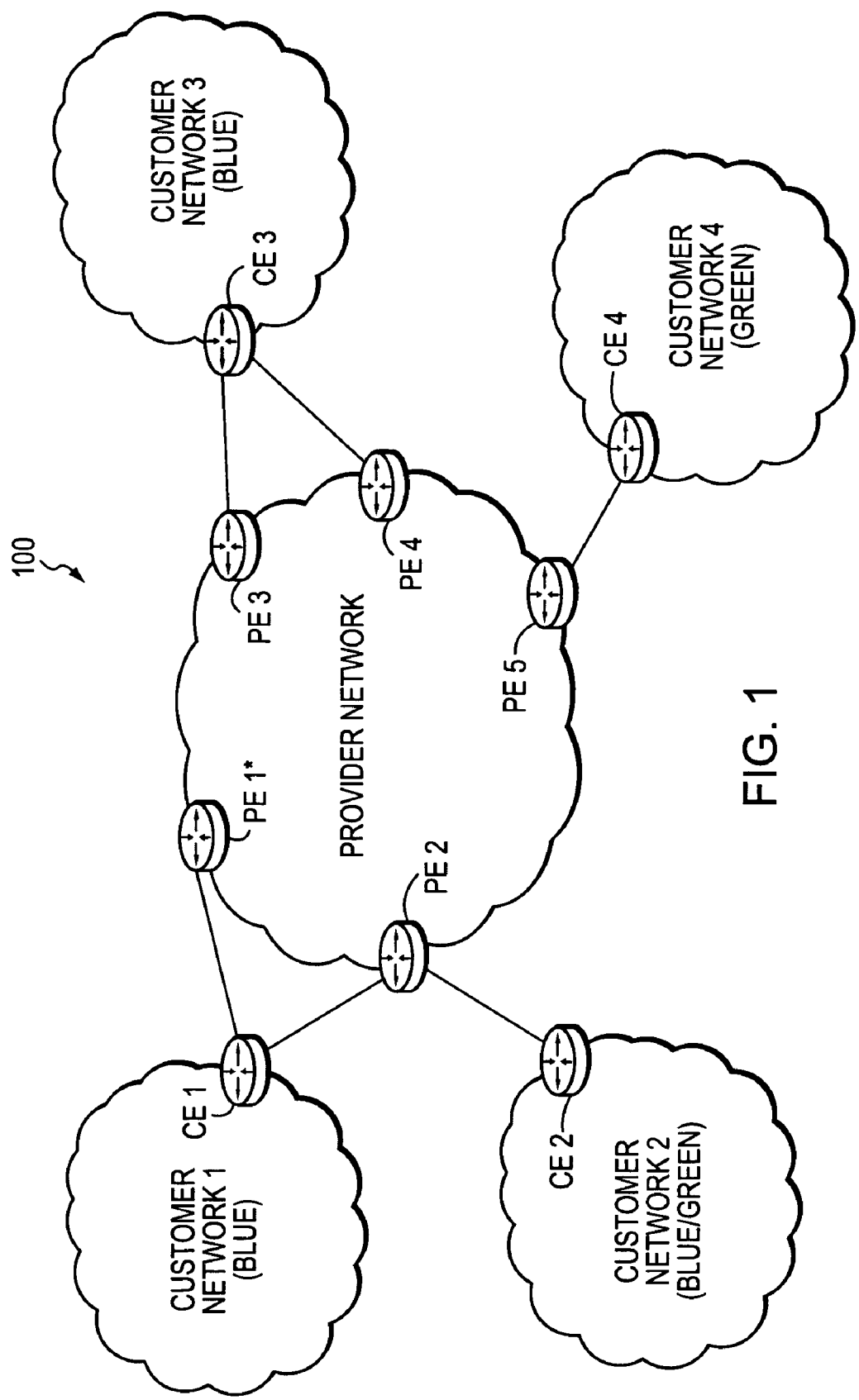
FIG. 1 is a schematic block diagram of an exemplary computer network that may be used in accordance with the present invention.

FIG. 1 is a schematic block diagram of an exemplary computer network 100 comprising a provider network, (e.g., a service provider network) interconnected to one or more customer networks (customer networks 1-4). Although the provider and customer networks are described illustratively herein as autonomous systems, those skilled in the art will appreciate that they may be configured as one or more routing domains or other networks or subnetworks. The provider network comprises one or more network nodes, including a set of communicating border nodes or routers (illustratively, provider edge devices, or "PEs") PE1-PE5, through which client communications, such as data packet traffic, can pass into and out of the provider network. The network comprises provider devices (Ps) (not shown) configured to communicate traffic and information internally within the provider network.

The customer networks 1-4 also comprise one or more network nodes, including a set of communicating border nodes or routers (illustratively, customer edge devices, or "CEs") CE1-CE4, respectively, through which client communications can pass into and out of the customer networks. For example, the PEs and CEs may be configured as connections to/from one or more virtual private networks (VPNs) e.g., for a Multi-Protocol Label Switching (MPLS)/VPN network, as will be understood by those skilled in the art.

Illustratively, two VPNs are configured within network 100, denoted as a "blue" VPN and a "green" VPN. For instance, customer networks 1, 2, and 3 belong to VPN blue, while customer networks 2 and 4 belong to VPN green. Note that a single customer network (e.g., 2) may belong to more than one VPN, as will be understood by those skilled in the art. Also, a customer network need not belong to any VPNs, e.g., a customer network 5 belonging to no VPNs (not shown).

Each CE may communicate with an attached PE via a "PE-CE link" as shown, for 10 example CE1 communicating with PE1 over link PE1-CE1. Notably, the links may also be represented as CE-PE links (e.g., link CE1 -PE1), and the order of the link end nodes is equally interchangeable herein. These examples are merely representative. Those skilled in the art will understand that any number of routers, nodes, links, VPNs, and provider/customer networks may be used in the computer network 100 and connected in a is variety of ways, and that the view shown herein is for simplicity. In particular, while each customer network 1-4 is shown having one CE, those skilled in the art will understand that other configurations are possible with more than one CE per customer network.

Data packets may be communicated by the provider and customer networks using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc. Routing decisions within a provider or customer network may rely on predetermined "interior" gateway protocols (IGPs), such as conventional link-state or distance-vector protocols. In addition, data packets containing network topology information may be exchanged among provider and customer networks using "external" gateway protocols, such as the Border Gateway Protocol (BGP), e.g., the Multi-Protocol (MP)-BGP. Those skilled in the art will understand that other communication protocols may be used within and among the networks, and that those mentioned above are merely representative.

Figure 2:
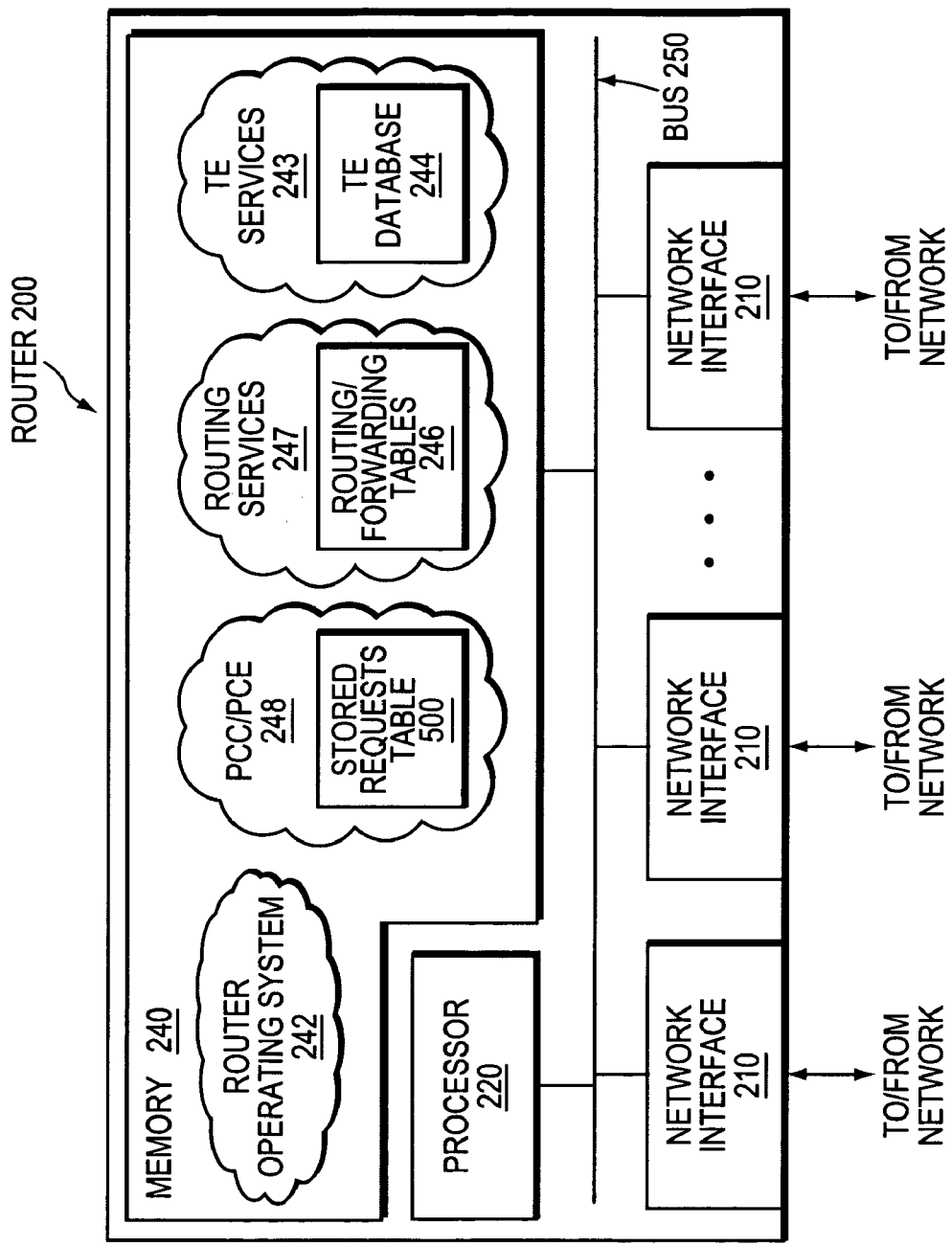
FIG. 2 is schematic block diagram of an exemplary router that may be advantageously used with the present invention.

FIG. 2 is a schematic block diagram of an exemplary node/router 200 that may be advantageously used with the present invention, such as, e.g., an edge device. The node comprises a plurality of network interfaces 210 (e.g., line cards), a processor 220, and a memory 240 interconnected by a system bus 250. The network interfaces 210 contain the mechanical, electrical and signaling circuitry for communicating data over physical links coupled to the network 100. The network interfaces may be further configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for VPN access, known to those skilled in the art.

The memory 240 comprises a plurality of storage locations that are addressable by the processor 220 and the network interfaces 210 for storing software programs and data structures associated with the present invention. The processor 220 may comprise necessary elements or logic adapted to execute the software programs and manipulate the data structures, such as TE Database (TED) 244, routing and forwarding tables 246, and stored request tables 500. A router operating system 242 (e.g., the Internetworking Operating System, or IOS™, of Cisco Systems, Inc.), portions of which are typically resident in memory 240 and executed by the processor, functionally organizes the router by, inter alia, invoking network operations in support of software processes and/or services executing on the router. These software processes and/or services may include Path Computation Element/Client (PCC/PCE) services 248, routing services 247, and Traffic Engineering (TE) services 243. It will be apparent to those skilled in the art that other processor and memory means, including various computer-readable media, may be used to store and execute program instructions pertaining to the inventive technique described herein.

Routing services 247 contain computer executable instructions executed by processor 220 to perform functions provided by one or more routing protocols, such as OSPF, IS-IS, IP, BGP, etc. These functions may be configured to manage a routing information database (RIB) and/or a forwarding information database (FIB) containing, e.g., data used to make routing and forwarding decisions, such as in routing/forwarding tables 246. Routing services 247 may also perform functions related to virtual routing protocols, such as maintaining VRF instances (not shown), as will be understood by those skilled in the art.

TE services 243 contain computer executable instructions for operating TE functions in accordance with the present invention. TED 244 is illustratively resident in memory 240 and used to store TE information provided by the routing protocols, such as IGP, RSVP, and/or BGP (e.g., with TE extensions), including, inter alia, TE topology as described herein. The TED 244 is illustratively maintained and managed by TE services 243.

In one embodiment, the routers described herein (e.g., PEs) may be IP routers that implement Multi-Protocol Label Switching (MPLS) and operate as label switched routers (LSRs). In one simple MPLS scenario, at an ingress to a network, a label is assigned to each incoming packet based on its forwarding equivalence class before forwarding the packet to a next-hop router. At each router, a forwarding selection and a new substitute label are determined by using the label found in the incoming packet as a reference to a label forwarding table that includes this information. At the network egress (or one hop prior), a forwarding decision is made based on the incoming label but optionally no label is included when the packet is sent on to the next hop. The paths taken by packets that traverse the network in this manner are referred to as label switched paths (LSPs). A protocol that may be used to distribute the labels throughout the network, e.g., a label distribution protocol (LDP), is described in RFC 3036, entitled *LDP Specification*, dated January 2001, the contents of which are hereby incorporated by reference in its entirety. Notably, where MPLS Traffic Engineering (TE) is used, TE-LSPs may be created that have guaranteed bandwidth under certain conditions, as will be understood by those skilled in the art.

Although the illustrative embodiment described herein is directed to MPLS, it should also be noted that the present invention may advantageously apply to Generalized MPLS (GMPLS), which pertains not only to packet and cell-based networks, but also to Time Division Multiplexed (TDM) and optical networks. GMPLS is well known and described in RFC 3945, entitled *Generalized Multi-Protocol Label Switching (GMPLS) Architecture*, dated October 2004, and RFC 3946, entitled *Generalized Multi-Protocol Label Switching (GMPLS) Extensions for Synchronous Optical Network (SONET) and Synchronous Digital Hierarchy (SDH) Control*, dated October 2004, the contents of both of which are hereby incorporated by reference in their entirety.

The present invention is directed to a technique for efficiently routing IP traffic on paths between CEs across a provider network ("CE-CE paths") in a computer network. According to the novel technique, a PCE, e.g., a PE, may learn dynamic link attribute information of remote links from the provider network to one or more remote CEs (e.g., "PE-CE links" or "CE-PE links"). A multi-homed requesting CE requests from the PCE a set of CE-CE path metrics (e.g., costs) to one or more remote destination address prefixes, e.g., via each multi-homed CE-PE link from the requesting CE. Notably, the request may indicate one or more requested path attributes (required diversity, maximum cost, etc.). In response to the request, the PCE computes the set of available CE-CE paths and current metrics to the remote destination address prefixes and returns the corresponding CE-CE path metrics to the requesting CE. The requesting CE modifies its IP forwarding entries accordingly in order to perform IP traffic routing corresponding to the CE-CE path metrics (e.g., asymmetrical load balancing) across its multi-homed CE-PE links.

In accordance with the present invention, the PCE, e.g., PE1*(e.g., where "*" denotes that the PE is configured as a PCE), may learn of the dynamic link attribute information of links within the provider network (e.g., among PEs and one or more provider routers, "Ps") though conventional methods, such as through IGP, iBGP, etc., as will be understood by those skilled in the art. In addition, the PCE also learns the dynamic link attribute information of remote PE-CE links (e.g., link PE3-CE3, link PE4-CE3, etc.). Above incorporated U.S. application Ser. No. 11/302,595, entitled TECHNIQUE FOR ENABLING TRAFFIC ENGINEERING ON CE-CE PATHS ACROSS A PROVIDER NETWORK, describes a preferred embodiment and method that may be used in accordance with the present invention for the PCE to learn the dynamic remote PE-CE link information.

As described in commonly-owned copending U.S. application Ser. No. 11/302,595, remote PEs (e.g., PE3, PE4, etc.) convey dynamic link attribute information (also referred to as "TE information") of attached PE-CE links to other PEs in the provider network, such as, e.g., through TE advertisements using TE extensions to Multi-Protocol BGP (MP-BGP) messages. TE information contained within the MP-BGP extensions may comprise any available link attribute information, such as, inter alia, an address of the remote CEs (e.g., in a VPN context, such as a VPNv4 address), an address of the conveying PE, a route target (RT) (e.g., an associated color, blue), and one or more TE-based PE-CE link attribute information fields. Example TE-based PE-CE link attribute information comprise, e.g., dynamically measured IP bandwidth, reservable MPLS bandwidth, unreserved bandwidth, administrative group (color), TE metrics, or other conventional metrics that may be used for TE, e.g., cost. Upon receiving the TE information, each receiving PE expands a TED, such as TED 244, for information regarding the provider network (i.e., a "core TED") to include TE-configured PE-CE links, e.g., by updating one or more corresponding VPN TEDs (VTEDs) for each VPN maintained by the receiving PE. The result, generally, is that each PE of the provider network may maintain TE topology information for the entire provider network and any relevant PE-CE links to customer networks.

Notably, while the above incorporated U.S. application Ser. No. 11/302,595 describes obtaining dynamic remote PE-CE link attribute information (TE information), the present invention may also be advantageously used with information only of the provider network (PE-PE paths), as well. Those skilled in the art, however, will appreciate that a larger TE topology of dynamic link attribute information (e.g., including the remote PE-CE link information) is advantageous for optimal performance.

In accordance with one aspect of the present invention, a multi-homed requesting CE (e.g., CE1) requests from the PCE (PE1*) a set of CE-CE path metrics (e.g., costs) to one or more remote destination address prefixes (e.g., prefix 1, not shown). The remote destination address prefixes may be learned by conventional routing protocols over the CE-PE links (CE1-PE1, CE1-PE2), e.g., through eBGP messages, Routing Information Protocol (RIP) messages, etc., as will be understood by those skilled in the art. For example, the requesting CE may desire to efficiently route IP traffic destined for a voice over IP (VoIP) gateway, a remote telecommuter office, etc., within a remote customer network (e.g., customer network 3), or may desire to efficiently route any IP traffic to the customer network (e.g., all prefixes reachable beyond CE3). Notably, the requesting CE may learn of the PCE through PCE discovery (PCED) messages, or through manual configuration.

Figure 3:
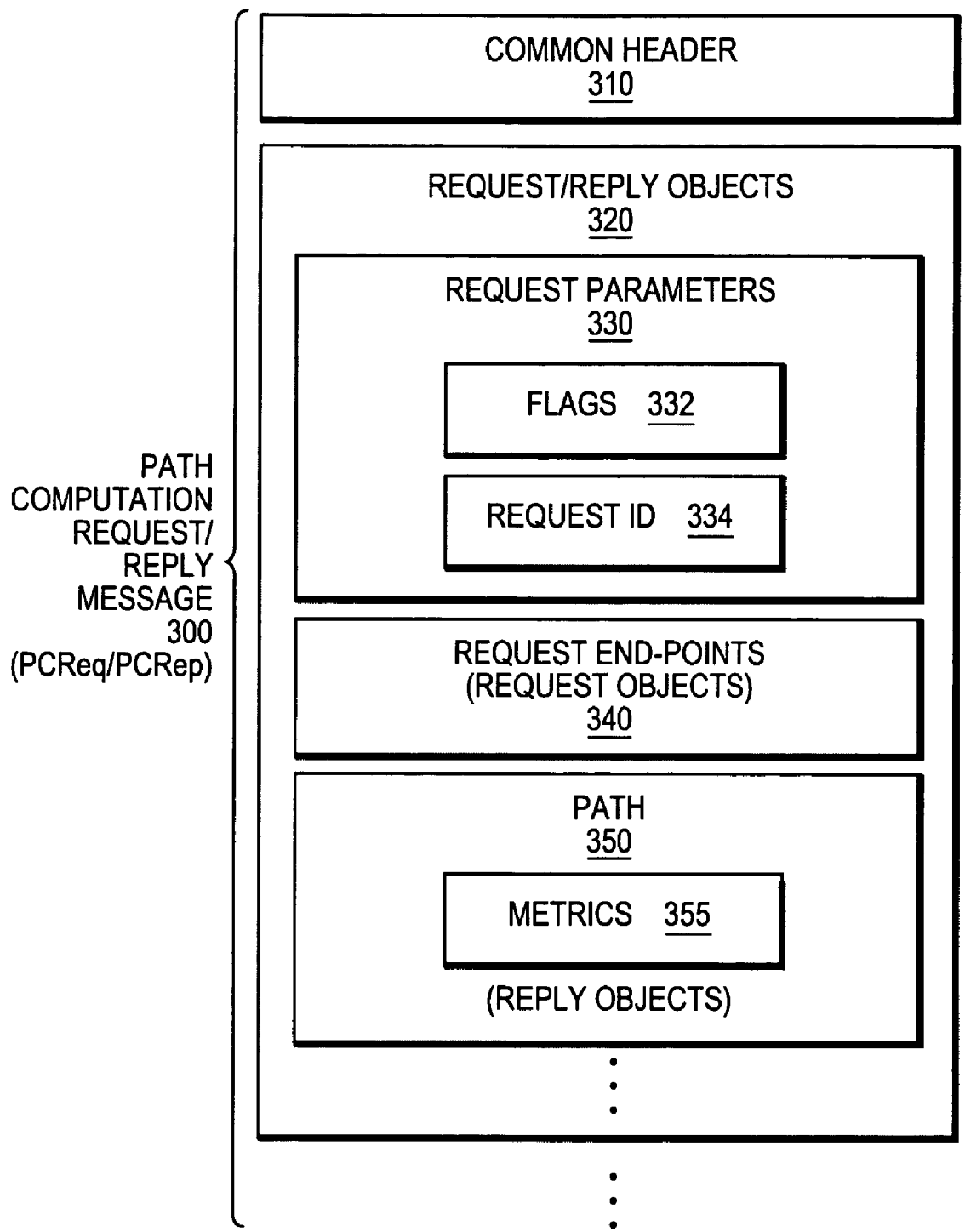
FIG. 3 is a schematic block diagram of an illustrative path computation request/reply message that may be advantageously used with the present invention.

Illustratively, the path computation request (and response) between the CEs (a path computation client, "PCC") and PCE may be exchanged in accordance with a protocol specified in Vasseur, et al., *Path Computation Element (PCE) Communication Protocol (PCEP)—Version 1*-<draft-ietf-pce-pcep-01.txt>, Internet Draft, February 2006, the contents of which are hereby incorporated by reference in its entirety. FIG. 3 is a schematic block diagram of an illustrative path computation request/reply message 300 that may be advantageously used with the present invention. Message 300 contains, inter alia, a common header 310, and one or more request or reply objects 320. The common header may be used to indicate a source and destination address of the request, and also the type of request, e.g., a request (PCReq, or "PCReq_IP" for IP related requests), a reply (PCRep_IP), error, notification, etc. Within the request/reply object 320 (for both PCReqs and PCReps) are at least a set of request parameters (RPs) 330, which may comprise various flags 332 and a request identification (request ID) object 334. It should be understood that the use of PCEP serves only as an example, and that other communication protocols may be used in accordance with the present invention.

In the case of path computation requests, a requested path end-points field 340 may be used by the requesting CE to indicate to the PCE the set of remote destination address prefixes to which the CE is requesting a path. For instance, each of the remote address prefixes (e.g., prefix 1) may populate destination end-points within the object 340, e.g., as an access control list (ACL). Also, the requesting CE may request CE-CE paths via each of its multi-homed CE-PE links by either specifically requesting a source end-point of each locally attached PE (e.g., PE1 and PE2), or by indicating itself (e.g., CE1) as the source end-point. In the latter case, the PCE may be configured to determine the set of locally attached PEs to the requesting CE. Illustratively, and referring again to FIG. 1, CE1 is multi-homed to the provider network via two links, CE1-PE1 and CE1-PE2. Those skilled in the art, however, will understand that any number of multi-homed links may be used in accordance with the present invention. Notably, the requesting CE may request that the PCE return only the best CE-CE path.

The path computation request 300 may also indicate one or more requested path attributes, e.g., in request parameters field 330. For example, the requesting CE may wish to receive only a maximum number of paths (e.g., one, two, etc.), or to receive only a set of paths that are diverse from each other (e.g., for failure protection, etc., as will be understood by those skilled in the art). Other various constraints may also be requested, such as, e.g., path boundaries (maximum costs, maximum delays, maximum link utilization, minimum available IP bandwidth, etc.). Other attributes/constraints may be understood by those skilled in the art, and those mentioned herein are representative examples.

The PCE receives the path computation request and, in accordance with another aspect of the present invention, computes the set of CE-CE paths and current metrics to the remote destination address prefixes from any attached PE (PE1 or PE2) in accordance with conventional PCE computation techniques as will be understood by those skilled in the art. The PCE, in particular, may be advantageously used because of its ability to have a more complete TE topology (e.g., not simply from its own view). The PCE may thus determine the best CE-CE path from any attached ingress PE (e.g., PE2) to the destination address prefixes. As those skilled in the art will appreciate, sending the requests to a locally attached PE acting as PCE thus extends conventional PCE technology to IP routing.

Illustratively, upon receiving a request, the PCE selects a set of PEs advertising routes to the requested remote destination address prefixes (e.g., PE3 and PE4, which reach CE3). For each PE of the set, the PCE computes best paths to the PEs from the requesting CE. Specifically, the PCE computes a shortest path (e.g., using an SPF computation) from itself (PE1*) to the destination, and also from each ingress PE available to the requesting CE (e.g., PE2). The shortest/best paths may be based on any selected metric (e.g., cost, link utilization, etc.) used by the provider network and remote PE-CE links. For instance, conventional IGP costs may be used for IGP-routed provider networks, or for LDP label switched networks, while other tunnel-based costs (e.g., TE-LSP costs) may be used for networks employing TE-LSPs between PEs (e.g., learned from Forwarding Adjacencies). The PCE may then combine the computed shortest paths from the ingress PEs with the metrics of the CE-PE links from the requesting CE (e.g., CE1-PE1, CE1-PE2) to compute the full CE-CE path and corresponding current metrics. Alternatively, the PCE may simply compute the paths from the ingress PEs, and the requesting CE can supplement the results with its knowledge of the CE-PE links; however this approach is sub-optimal.

Notably, a multi-PCE approach may also be used to compute the best CE-CE path in accordance with the present invention. For instance, an egress PE of the provider network to the destination customer network (e.g., PE3) may be configured as a PCE as well (not shown). In circumstances where the attached ingress PCE (e.g., PE1*) has not learned the remote PE-CE link attribute information and is otherwise unaware of the information, the ingress PCE (PE1) may send another path computation request 300 to the egress PCE (PE3) in order to obtain the metrics of the remote PE-CE links. The ingress PCE may then utilize the returned information from the egress PCE to compute the CE-CE path and associated metrics accordingly, as will be understood by those skilled in the art.

Figure 4:
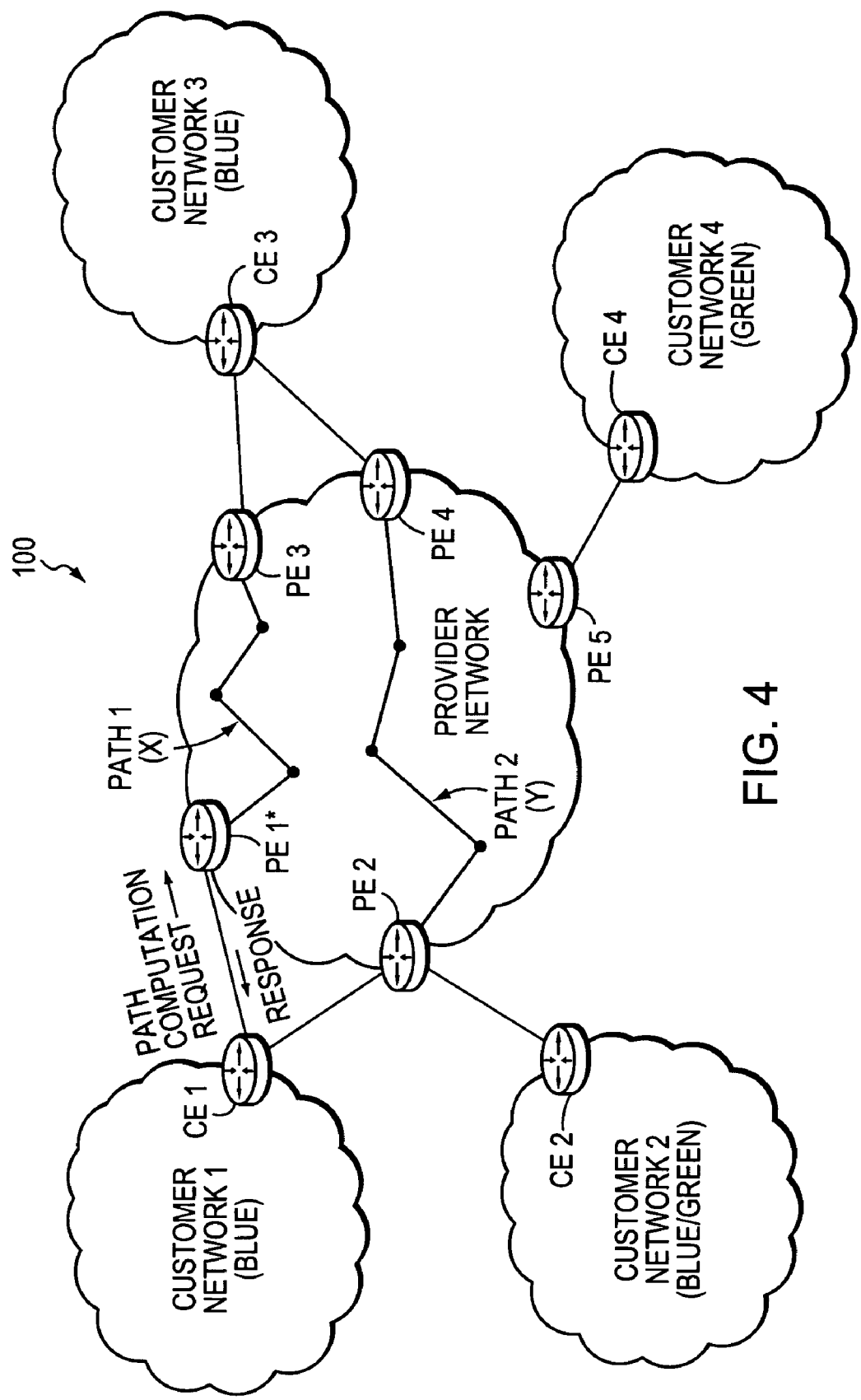
FIG. 4 is a schematic block diagram of the exemplary computer network of FIG. 1 with computed CE-CE paths in accordance with the present invention.

FIG. 4 is a schematic block diagram of the exemplary computer network of FIG. 1 with computed CE-CE paths in accordance with the present invention. Illustratively, Path 1 may have been computed as the best path from PE1 to CE3 (via PE3), and has a metric of "X," while Path 2 may have been computed as the best path from PE2 to CE3 (via PE4), and has a metric of "Y." As described above, the paths may be computed based on current metrics (e.g., dynamic link attribute information) of links within the provider network, as well as remote PE-CE links. Those skilled in the art will understand that the CE-CE paths need not be diverse, e.g., both paths may traverse PE3, and that the paths shown are merely examples.

Illustratively, the PCE returns the corresponding CE-CE path metrics to the requesting CE using a path computation reply (PCRep) message 300 as shown in FIG. 3 above. Specifically, a path object 350 may be used within a reply message 300 to convey the set of paths and one or more corresponding metrics 355. In response to requested attributes from the CE, as mentioned above, the PCE may be configured to return only those paths that meet the constraints (e.g., cost less than 300, only the best two paths, etc.). Alternatively, the PCE may be configured to return all computed paths to the CE, but with an indication (e.g., in metrics field 355 and/or flags field 332) of which paths do/do not meet the requested constraints. Also, where the CE has requested only the best path, the PCE may return the best CE-CE path only, e.g., with or without associated metrics.

In order to protect the privacy of the provider network and beyond, the PCE of the present invention may be configured to return paths corresponding simply to the ingress PEs (e.g., Path 1 via PE1 and Path 2 via PE2). In this manner, the actual hops/nodes traversed within the provider network remain hidden from the CE. Further, the PCE may "hide" the actual metrics of the provider network (e.g., cost) by supplying the CE with weighted values corresponding to the actual metrics. For instance, assume the cost X of Path 1 to be "100," while the cost Y of Path 2 may be "200." The PCE may determine that the costs may be represented by a weight (e.g., a ratio) of "1" for X and "2" for Y (e.g., 1:2).

Optionally, the PCE may be configured as a stateful PCE, i.e., storing the results computed in response to received requests. For instance, a CE may send many path computation requests for a particular remote destination address prefix, such as, e.g., one request per second for a VoIP gateway destination, etc. Because each request is for the same source and destination, it may be advantageous for the PCE to store (or cache) the results of its computation, and to return the stored results for each request. FIG. 5 is a schematic block diagram of an exemplary stored requests table 500 that may be used in accordance with the present invention. Stored requests table 500 is illustratively stored in memory 240 and includes one or more entries 530, each comprising a plurality of fields for storing a requesting node ID 505, a request ID 510, a set of CE-CE paths 515, and a set of corresponding metrics 520. The stored requests table 500 is illustratively maintained and managed by PCE services 248. Accordingly, PCE services 248 populates the stored requests table 500 with computed CE-CE path information based on received path computation request messages 300 in accordance with the present invention. While a single stored requests table 500 is shown for a plurality of CEs, the PCE may alternatively maintain one stored requests table 500 for each CE attached to and/or managed by the PCE.

Use of the stored requests table 500 allows, the PCE to conserve resources (e.g., processing) by eliminating the need to re-compute the CE-CE paths for each received duplicate request. Notably, the PCE may determine that the request is a duplicate through examination of the request ID 510 (if unchanged by the CE), or through the requesting node 505 in conjunction with the resulting paths 515 (i.e., having the same source and destination end-points). In the event the PCE detects a configurable change in the CE-CE paths (e.g., though one or more advertisements from IGP, iBGP, eBGP, MP-BGP, etc.), the PCE may re-compute the CE-CE paths and metrics accordingly, e.g., in response to a subsequently received request, or preemptively based on the stored values within the table 500, as will be understood by those skilled in the art. Moreover, the requesting CE may be aware of the stateful configuration of the PCE. Accordingly, the requesting CE may be configured to send a path computation request to the PCE for the CE-CE path metrics, further requesting that the PCE return future replies in response to updated paths/metrics. In this way, the requesting CE need not continuously send requests to the PCE to remain up-to-date, as the PCE will notify the CE of any updates as they occur (e.g., substantially immediately or buffered, as will be understood by those skilled in the art).

Notably, the PCE may be configured with one or more policies (rules) to govern the response to received requests. For example, the PCE may wish to dampen the amount of requests processed, e.g., where the CE sends many requests in an attempt to remain up-to-date, etc. For instance, the PCE may determine that requests received less than a configurable time apart are not to be processed. Accordingly, the PCE may reject those requests, e.g., by explicitly notifying the CE of the rejection, or by ignoring the requests, etc. Further, the PCE may restrict which CEs are allowed to request CE-CE path metrics in accordance with the present invention, or to restrict requests based on destination address prefixes, etc., such as based on agreements between the customer and provider networks, as will be understood by those skilled in the art.

Figure 6:
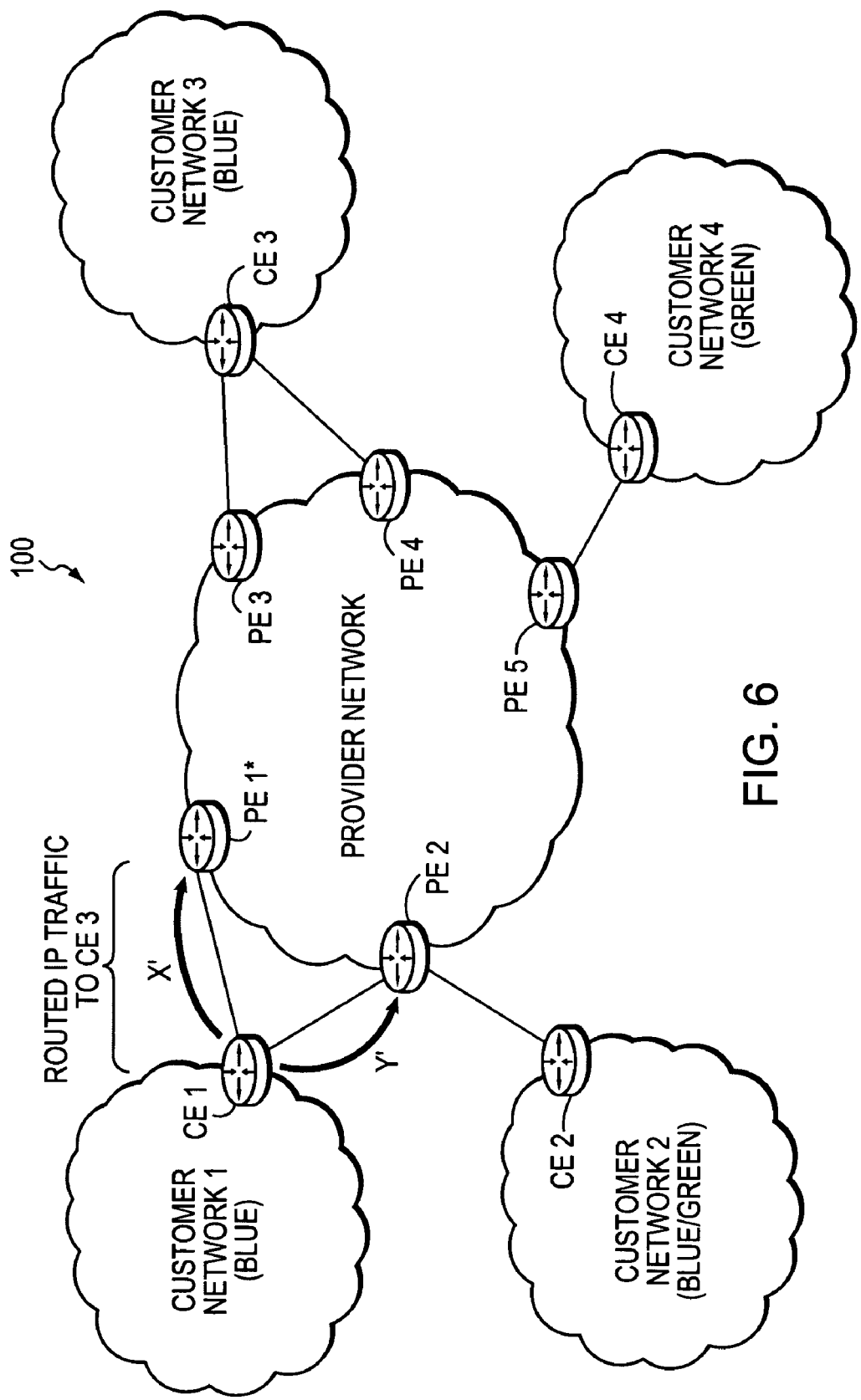
FIG. 6 is a schematic block diagram of the exemplary computer network of FIG. 1 having IP traffic efficiently routed in accordance with the present invention.

In accordance with yet another aspect of the present invention, the requesting CE receives the returned results (e.g., in PCRep message 300), and modifies its IP forwarding entries (e.g., in routing/forwarding table 246) accordingly in order to perform IP traffic routing corresponding to the CE-CE path metrics across its multi-homed CE-PE links. For instance, the requesting CE may load balance IP traffic destined for the remote address prefixes based asymmetrically on the corresponding CE-CE path metrics received. For example, CE1 may determine to route twice as much IP traffic over Path 1 (cost 100) than over Path 2 (cost 200). The load balancing may be based on a per packet distribution, or per destination address prefix, as will be understood by those skilled in the art. FIG. 6 is a schematic block diagram of the exemplary computer network of FIG. 1 having is IP traffic efficiently routed in accordance with the present invention. For example, CE1 may route IP traffic toward CE3 (e.g., to remote destination address prefixes reachable via CE3) over links CE1-PE1 and CE1-PE2 according to the path metrics of the corresponding paths (e.g., Path 1 and Path 2, respectively). Assuming asymmetric load balancing, then, a ratio of X' IP traffic (relating to cost X of Path 1) and a ratio of Y' IP traffic (relating to cost Y of Path 2) may be sent over respective links CE1-PE1 and CE1-PE2 accordingly.

While asymmetric load balancing is one example of corresponding IP routing, the CE may alternatively determine i) to send IP traffic over a best CE-CE path only, ii) to remove the worst CE-CE path from IP routing and load balance over the remaining CE-CE paths, iii) to remove any CE-CE path worse that the best CE-CE path by a configurable amount (e.g., any paths with costs greater than twice that of the best path, etc.), iv) etc. Other corresponding IP routing based on CE-CE path metrics will be understood by those skilled in the art, and those mentioned herein are representative examples. In particular, where the CE has requested only the best CE-CE path, as described above, the CE may route all IP traffic over the best corresponding CE-PE link. Also, the present invention may be extended to multicast IP routing, such as where the requesting CE distributes IP traffic over multiple CE-PE links to multiple destination address prefixes, and selects which CE-PE links to utilize/exclude based on the CE-CE path metrics to each destination address prefix accordingly.

Figure 7:
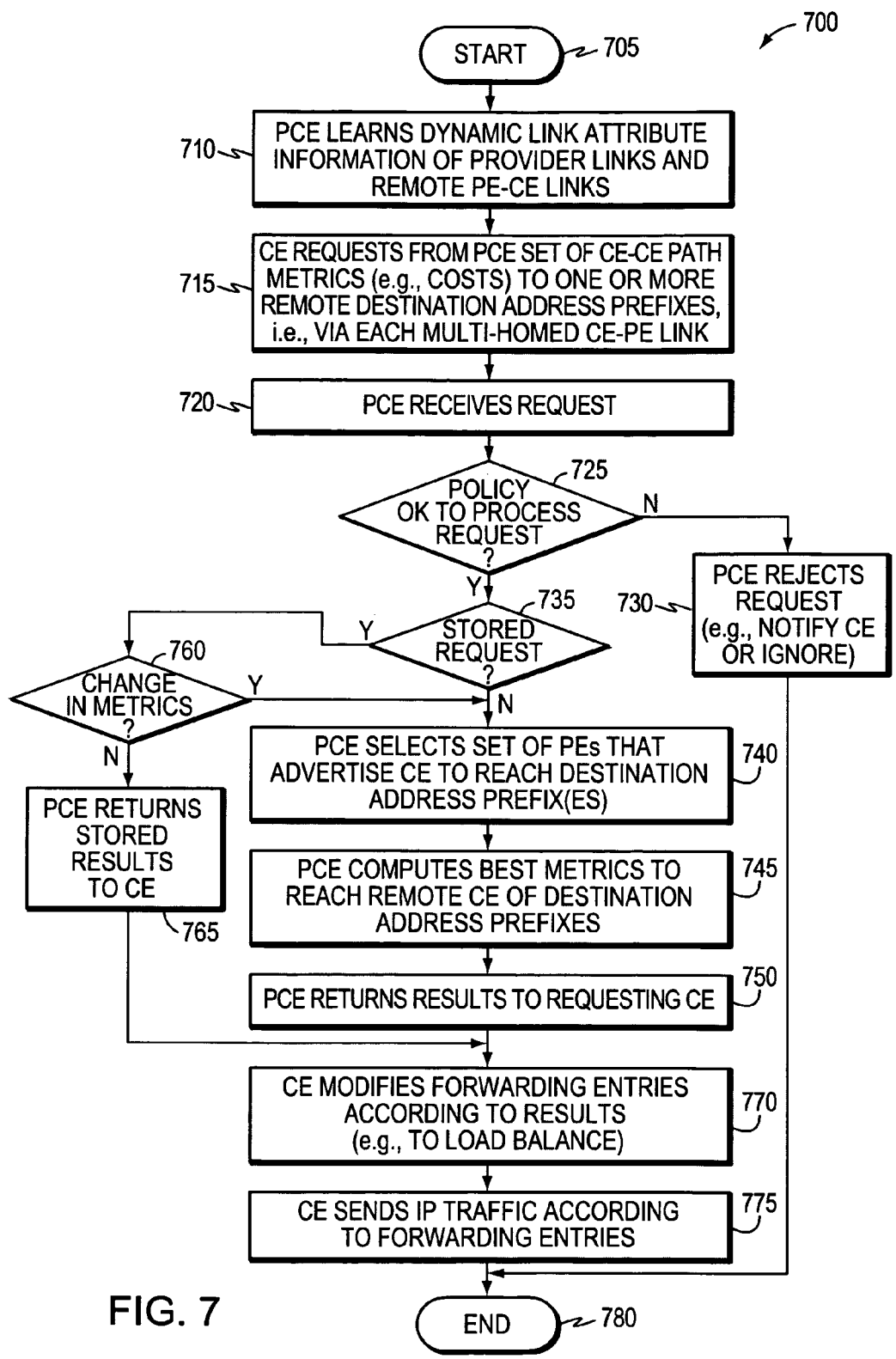
FIG. 7 is a flowchart illustrating a procedure for efficiently routing IP traffic on CE-CE paths in accordance with the present invention.

FIG. 7 is a flowchart illustrating a procedure for efficiently routing IP traffic on CE-CE paths in accordance with the present invention. The procedure 700 starts at step 705, and continues to step 710, where a PCE (e.g., PE1\*) may learn dynamic link attribute information of provider links within the provider network and remote PE-CE links, as described above. At step 715, a CE (e.g., CE1) requests from the locally attached PCE a set of CE-CE path metrics (e.g., costs) to one or more remote destination address prefixes, i.e., via each multi-homed CE-PE link (e.g., link CE1-PE1 and link CE1-PE2). Notably, as mentioned above, the request may contain one or more requested path attributes (max delay, max cost, etc.), and may also request a single best path to the destination.

The PCE receives the request in step 720, and may determine whether the request violates any request policies in step 725, e.g., too frequent requests, improper CE, etc., as described above. If so, the PCE rejects the request in step 730, such as by notifying the CE of the rejection or by simply ignoring the request. If policy dictates that it is acceptable ("OK") to process the request in step 725, then the PCE may determine whether the results of a previously stored request match the current request in step 735. If not (e.g., a first request, or a stateless PCE), the PCE selects a set of PEs that have advertised a CE to reach the destination address prefixes in step 740, such as by performing a look-up operation into its routing tables, as described above. In step 745, the PCE computes the best metrics to reach the remote CE of the destination address prefixes, e.g., IGP shortest path costs, tunnel costs, etc., as described above. The PCE returns the results (e.g., costs, weights, best choice, etc.) to the requesting CE in step 750. Notably, as described above, the PCE may use a multi-PCE approach to obtain the remote PE-CE link information in the event it has not otherwise learned the information.

If at step 735, however, the PCE has previously stored the results for the request (e.g., from prior requests in a stateful PCE), the PCE determines in step 760 whether the results have changed (e.g., metrics or cost) since storage. For instance, links along the stored path(s) may have been removed, or their states may have changed (e.g., configurably), causing the PCE to re-select the set of PEs to reach the destination in step 740, and re-compute the best metrics in step 745. If the stored metrics have not changed in step 760, the PCE returns the stored results to the requesting CE in step 765, such as by returning the actual metrics again, or by informing the CE that no change has occurred, as mentioned above. Notably, in the example described above where the CE issues only a single request from the PCE to be notified when changes occur, the PCE continuously monitors changes in the metrics in step 760, and continues to step 740 as a result of a detected change accordingly.

In step 770, the CE receives the results and modifies its forwarding entries (e.g., in forwarding table 246) according to the results. For example, the CE may load balance (e.g., asymmetrically) the IP traffic, or may select the best path, etc., as described above.

The CE may then send IP traffic to the destination address prefixes according to the forwarding entries. The procedure 700 ends at step 780.

Advantageously, the novel technique efficiently routes IP traffic on CE-CE paths in a computer network. By utilizing PCEs with knowledge of dynamic link attribute information of CE-CE path links, the novel technique allows for a multi-homed CE to efficiently route, e.g., load balance, IP traffic across its multi-homed CE-PE links accordingly. In particular, the novel technique advantageously utilizes PCEs for IP traffic. Further, the dynamic nature of the novel technique alleviates the need for cumbersome manual configuration.

While there has been shown and described an illustrative embodiment that efficiently routes IP traffic on CE-CE paths in a computer network, it is to be understood that various other adaptations and modifications may be made within the spirit and scope of the present invention. For example, the invention has been shown and described herein with MPLS VPN networks (customer/provider networks). However, the invention in its broader sense is not so limited, and may, in fact, be used with other types of multi-homed networks, such as between areas, levels, autonomous systems, etc., as will be understood by those skilled in the art. Also, while the present invention describes a CE requesting information from a single PCE with the ability to compute paths from each available ingress PE, the CE may also alternatively request path computation from each independent ingress PE, and may combine the results itself accordingly. Further, while the invention is illustratively performed between a CE and a PE, those skilled in the art will understand that, e.g., where multiple provider networks are interconnected, the invention may equally be applied to multi-homed PE-PE links between provider networks (in other words, where the CE is a PE of another network). Moreover, the present invention may also be used recursively through multiple networks, e.g., from a CE of a first customer network to a first PE of a first provider network to a second PE of a second provider network, etc. As mentioned above, this recursive technique may utilize the multi-PCE computation of the best CE-CE path.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for efficiently routing Internet Protocol (IP) traffic on paths between customer edge devices (CEs) across a provider network ("CE-CE paths") in a computer network, the method comprising:
   requesting from a path computation element (PCE), at a multi-homed CE, a set of CE-CE path metrics to one or more remote destination address prefixes;
   in response, computing, at the PCE, a set of available CE-CE paths and current metrics to the remote destination address prefixes;
   returning the corresponding CE-CE path metrics to the requesting CE; and
   utilizing the CE-CE path metrics to load balance, by the requesting CE, IP traffic across links coupled to the requesting CE.

2. The method as in claim 1, further comprising:
   learning, at the PCE, dynamic link attribute information of remote links from the provider network to one or more remote CEs.

3. The method as in claim 1, further comprising:
   learning, at the PCE, dynamic link attribute information of links of the provider network.

4. The method as in claim 1, further comprising:
   modifying IP forwarding entries of the requesting CE accordingly in order to perform IP traffic routing corresponding to the CE-CE path metrics.

5. The method as in claim 4, wherein utilizing the CE-CE path to load balance comprises:
   an operation selected from the group comprising: asymmetrically load balancing according to the corresponding CE-CE path metrics; selecting a best path; removing a worst path and load balancing traffic on remaining paths; and removing any paths having CE-CE path metrics configurably worse than a best path and load balancing traffic on remaining paths.

6. The method as in claim 1, further comprising:
   specifying the remote destination address prefixes in an access control list (ACL) of a request message.

7. The method as in claim 1, wherein the step of requesting further comprises:
requesting the set of CE-CE path metrics by a Path Computation Element (PCE) Communication Protocol (PCEP) request message.

8. The method as in claim 1, further comprising:
returning corresponding CE-CE path metrics to the requesting CE selected from a group comprising: path costs; utilized bandwidth; link utilization; and weighted values corresponding to path metrics.

9. The method as in claim 1, wherein the step of requesting further comprises:
requesting from the PCE, at the multi-homed CE, a set of CE-CE path metrics to one or more remote destination address prefixes along CE-CE paths that meet a set of requested path attributes.

10. The method as in claim 9, wherein the requested path attributes are selected from a group comprising: a maximum number of paths; diversity; maximum cost; and maximum delay.

11. The method as in claim 9, wherein the corresponding CE-CE path metrics returned to the requesting CE are selected from a group comprising: CE-CE path metrics corresponding to CE-CE paths that meet the set of requested path attributes; CE-CE path metrics corresponding to all CE-CE paths, along with an indication of CE-CE paths that do not meet the set of requested path attributes; and CE-CE path metrics corresponding to all CE-CE paths, along with an indication of corresponding requested path attributes for each of the CE-CE paths.

12. The method as in claim 1, further comprising:
in response to receiving a request from the CE, determining at the PCE whether to process the request based on one or more policies prior to computing the set of available CE-CE paths and current metrics.

13. The method as in claim 12, wherein the one or more policies define rules selected from a group comprising: dampening the requests; allowing requests from selected CEs; allowing requests to selected destination address prefixes; denying requests from selected CEs; and denying requests to selected destination address prefixes.

14. The method as in claim 12, further comprising:
in response to determining at the PCE not to process the request based on one or more policies, performing an action selected from a group comprising: rejecting the request; notifying the requesting CE of one or more policy violations; and ignoring the request.

15. The method as in claim 1, further comprising:
computing, at the PCE, the set of available CE-CE paths and current metrics to the remote destination address prefixes by i) selecting a set of provider edge devices (PEs) having advertised routes to the remote destination address prefixes, and ii) computing a set of best CE-CE paths and respective metrics to each PE of the set.

16. The method as in claim 1, further comprising:
storing, at the PCE, received requests along with corresponding computed CE-CE paths and current metrics;
returning the stored CE-CE path metrics to the requesting CE in the event there are no changes to the CE-CE paths and metrics; and
returning re-computed CE-CE path metrics to the requesting CE in the event there are changes to the CE-CE paths and metrics.

17. The method as in claim 1, further comprising:
requesting, at the requesting CE, that the PCE update the requesting CE of changes to CE-CE path metrics; and
returning re-computed CE-CE path metrics to the requesting CE in the event there are changes to the CE-CE paths and metrics.

18. The method as in claim 1, wherein the step of requesting further comprises:
requesting from the PCE, at the requesting CE, a set of CE-CE path metrics to one or more remote destination address prefixes, the requested set comprising CE-CE path metrics for a single best CE-CE path.

19. The method as in claim 1, wherein the PCE is a provider edge device (PE) locally attached to the requesting CE.

20. The method as in claim 1, wherein the PCE is an ingress PCE, the method further comprising:
requesting from an egress PCE, at the ingress PCE, a set of remote PE-CE path metrics to the remote destination address prefixes;
in response, computing, at the egress PCE, a set of available remote PE-CE paths and current metrics to the remote destination address prefixes; and
returning the corresponding remote PE-CE path metrics to the ingress PCE;
wherein the ingress PCE computes the set of available CE-CE paths and current metrics to the remote destination address prefixes based on the returned remote PE-CE paths and current metrics.

21. A system for efficiently routing Internet Protocol (IP) traffic on paths between customer edge devices (CEs) across a provider network ("CE-CE paths") in a computer network, the system comprising:
means for requesting from a path computation element (PCE), at a multi-homed CE, a set of CE-CE path metrics to one or more remote destination address prefixes;
in response, means for computing, at the PCE, a set of available CE-CE paths and current metrics to the remote destination address prefixes;
means for returning the corresponding CE-CE path metrics to the requesting CE; and
means for utilizing the CE-CE path metrics to load balance, at the requesting CE, IP traffic across links coupled to the requesting CE.

22. The system as in claim 21, further comprising:
means for learning, at the PCE, dynamic link attribute information of remote links from the provider network to one or more remote CEs.

23. The system as in claim 21, further comprising:
means for modifying IP forwarding entries of the requesting CE accordingly in order to perform IP traffic routing corresponding to the CE-CE path metrics.

24. A computer readable medium containing executable program instructions for efficiently routing Internet Protocol (IP) traffic on paths between customer edge devices (CEs) across a provider network ("CE-CE paths") in a computer network, the executable program instructions comprising program instructions for:
requesting from a path computation element (PCE), at a multi-homed CE, a set of CE-CE path metrics to one or more remote destination address prefixes;
in response, computing, at the PCE, a set of available CE-CE paths and current metrics to the remote destination address prefixes;
returning the corresponding CE-CE path metrics to the requesting CE; and
utilizing the CE-CE path metrics to load balance, by the requesting CE, IP traffic across links coupled to the requesting CE.

25. The computer readable medium as in claim 24, the executable program instructions further comprising program instructions for:
learning, at the PCE, dynamic link attribute information of remote links from the provider network to one or more remote CEs.

26. The computer readable medium as in claim 24, the executable program instructions further comprising program instructions for:
modifying IP forwarding entries of the requesting CE accordingly in order to perform IP traffic routing corresponding to the CE-CE path metrics.

27. A node adapted to efficiently route Internet Protocol (IP) traffic on paths between customer edge devices (CEs) across a provider network ("CE-CE paths") in a computer network, the node comprising:
one or more network interfaces;
a processor coupled to the one or more network interfaces and adapted to execute software processes; and
a memory adapted to store a Path Computation Element (PCE) process executable by the processor, the PCE process configured to: i) receive from a multi-homed requesting CE, a request for a set of CE-CE path metrics to one or more remote destination address prefixes, ii) in response, compute a set of available CE-CE paths and current metrics to the remote destination address prefixes, iii) return the corresponding CE-CE path metrics to the requesting CE to allow the requesting CE to load balance IP traffic across links of the requesting CE.

28. The node as in claim 27, the PCE process further configured to:
learn dynamic link attribute information of remote links from the provider network to one or more remote CEs.

29. A node configured to efficiently route Internet Protocol (IP) traffic on paths between customer edge devices (CEs) across a provider network ("CE-CE paths") in a computer network, the node comprising:
two or more network interfaces, the network interfaced multi-homed to the provider network;
a processor coupled to the network interfaces and adapted to execute software processes; and
a memory adapted to store one or more IP forwarding entries corresponding to the network interfaces, the memory also adapted to store a customer edge device (CE) process executable by the processor, the CE process configured to: i) request from a Path Computation Element (PCE) a set of CE-CE path metrics to one or more remote destination address prefixes, ii) receive from the PCE returned corresponding CE-CE path metrics, and iii) modify IP forwarding entries accordingly in order to load balance IP traffic on the paths corresponding to the CE-CE path metrics.

\* \* \* \* \*

UNITED STATES PATENT AND TRADEMARK OFFICE
CERTIFICATE OF CORRECTION

PATENT NO. : 7,522,603 B2  Page 1 of 1
APPLICATION NO. : 11/375216
DATED : April 21, 2009
INVENTOR(S) : Jean-Philippe Vasseur It is certified that error appears in the above-identified patent and that said Letters Patent is hereby corrected as shown below:

Col. 4, Line 19, please amend as shown:

area, and thus[[ is]] may be used for more optimal path comput-

Col. 7, Line 59, please amend as shown:

"PE-CE link" as shown, for[[ 10]] example CE1 communicating

Col. 7, Line 66, please amend as shown:

the computer network 100 and connected in a[[ is]] variety of

Col. 14, Line 21, please amend as shown:

computer network of FIG. 1 having[[ is]] IP traffic efficiently

Signed and Sealed this

Twelfth Day of October, 2010

David J. Kappos
*Director of the United States Patent and Trademark Office*